United States Patent [19]

Howard

[11] 4,174,584
[45] Nov. 20, 1979

[54] FISHING LURE

[76] Inventor: Charles R. Howard, 404 Newcomb St., Whitewater, Wis. 53190

[21] Appl. No.: 858,624

[22] Filed: Dec. 8, 1977

[51] Int. Cl.$^2$ ............................................. A01K 85/00
[52] U.S. Cl. .................................................... 43/42.5
[58] Field of Search ............................. 43/42.5, 42.51

[56] References Cited
U.S. PATENT DOCUMENTS

| | | | |
|---|---|---|---|
| 2,653,409 | 9/1953 | Hancock | 43/42.51 |
| 2,736,982 | 3/1956 | Curtis | 43/42.51 |
| 2,892,280 | 6/1959 | Davis | 43/42.5 |
| 3,418,744 | 12/1968 | Panicci | 43/42.5 |
| 4,075,778 | 2/1978 | Howard | 43/42.5 |

*Primary Examiner*—Robert Louis Spruill
*Assistant Examiner*—J. T. Zatarga

*Attorney, Agent, or Firm*—Andrus, Sceales, Starke & Sawall

[57] ABSTRACT

A fish lure is formed of an elongated strip. A central section of the strip is twisted so that the flat leading and trailing end portions are rotated 90° with respect to each other. The combined spinning and zig-zag action of the lure is both obtained and controlled by the location of the twisted portions in the strip, the relative sizing of the twisted and flat portions, and the size of the end portions with respect to each other. The length of the twisted section which provides the action, approximates that of the trailing end portion, which acts as a stabilizing rudder. The length of the leading end portion is about one fourth that of the trailing end portion to improve the balance between the end portions and the twisted central portion.

3 Claims, 3 Drawing Figures

FISHING LURE

BACKGROUND OF THE INVENTION—FIELD OF THE INVENTION

The present invention is directed to an artificial bait of the spoon type.

SUMMARY OF THE PRESENT INVENTION

A large number of artificial baits or lures have been developed which utilize a curved piece of metallic material to attract fish by their movement through the water. Some of these lures employ an indented piece of metal so that the lures are commonly referred to as "spoons". Other lures are formed in a generally helical configuration. The present invention lies in the provision of a lure of the latter type having an improved spinning and zig-zag action through the use of a tightly twisted central portion with a short leading portion and a longer trailing portion which serves as a rudder.

The lure of the present invention is formed of an elongated rectangular strip of material such as metal. Preferrably the strip is three times longer than it is wide since a narrower or wider strip results in lessening or loss of the zig-zag, i.e., trailing end fluttering action. Portions located at each end of the lure lie at right angles in the direction of elongation of the strip as a result of the central twisted portion. These planar end portions provide straight forward and trailing edges to the lure. A central portion of the lure comprises a twisted section which provides the action to the lure. The lengths of the central portion and the trailing end portion are approximately equal, the latter portion acting as a stabilizing rudder. The length of the leading end portion is about one fourth that of the trailing end portion. This prevents overpowering the action of the twisted central portion and moves the twisted portion forward in the lure so that the action of the lure is enhanced. A more middle positioning of the central portion removes much of the action from the lure.

BRIEF DESCRIPTION OF THE PREFERRED EMBODIMENT

Figure 1:
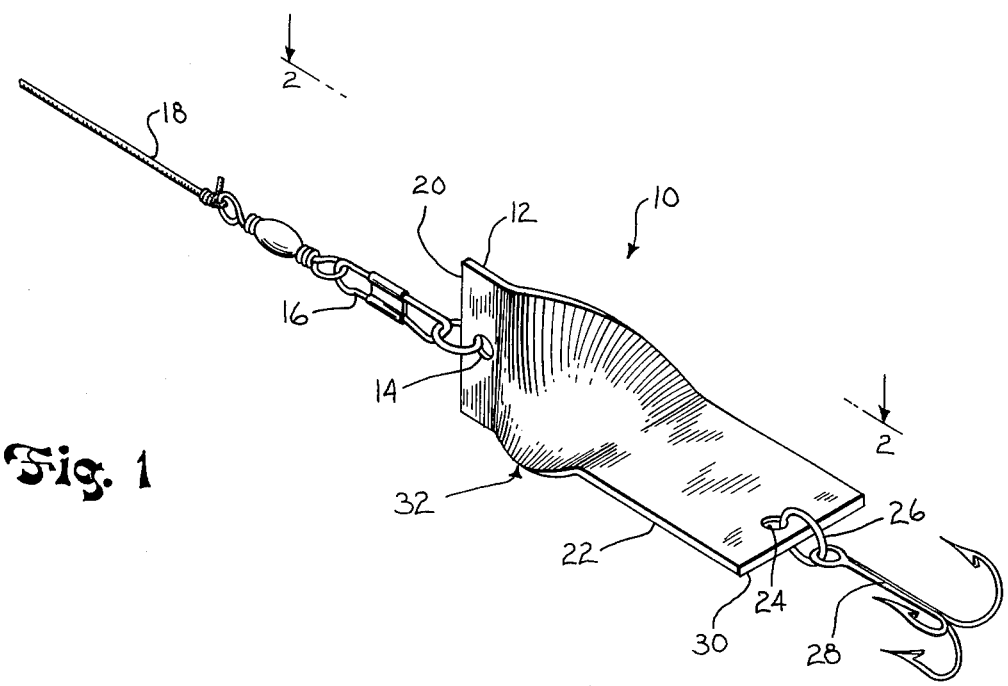
FIG. 1 is a prespective view of the fish lure of the present invention.
Figure 2:
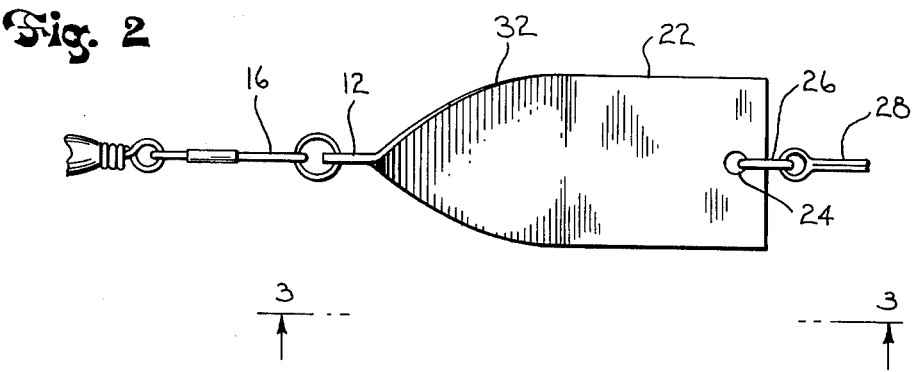
FIG. 2 is a top view of the lure.
Figure 3:
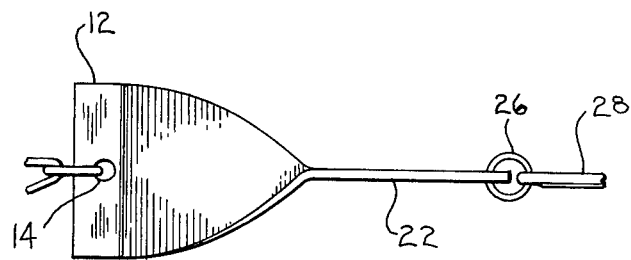
FIG. 3 is a side view of the lure taken at 90° to the orientation of the lure in FIG. 2.

The fish lure of the present invention is designated by the number 10 in FIG. 1. The lure is formed from a rectangular strip of material, such as metal or plastic, preferrably three times longer than wide. Lure 10 includes leading end portion 12 having a hole 14 for receiving connector 16 connected to fishing line 18. Leading end portion 12 is planar and represents a straight forward edge 20 for lure 10. Lure 10 also includes planar trailing end portion 22 containing hole 24 for receiving ring 26 for attaching a fish hook, such as treble hook 28. Trailing end portion 22 presents a straight rear edge 30. Leading end portion 12 and trailing end portion 22 are separated by twisted central section 32 which positions leading end portion 12 at right angles to the plane in which trailing end portion 22 lies.

The central section is tightly bent so that the 90° twist occupies the same length as trailing end portion 22. Leading end portion 12 is short occupying approximately one quarter of the length of trailing end portion 22.

In use, the tightly bent central section and its forward location in the lure impart a combined spinning and zig-zag action. The action may be characterized as "fast" or "tight" in that a large amount of spinning and zig-zag action may be obtained in small amount of through-the-water travel at a slow reeling-in speed. This action is, however, stabilized and controlled by particularly trailing end portion 22 which acts as a rudder. The zig-zag action thus consists of a large number of small oscillations along the line of retrival. The combined action of the lure resembles that of a minnow. The bent central section 32 reflects light toward the ends of the lure while flat ends 12 and 22 reflect light from side to side. This serves to attract fish from all directions. The square corners of rear edge 30, as well as the width of lure 10, helps to guide weeds past hook 28 without snagging.

The surfaces of the material of lure 10 may be plated to a shining, reflective finish. Various portions, or all, of lure 10 may also be painted.

Various modes of carrying out the invention are contemplated as being within the scope of the following claims particularly pointing out and distinctly claiming the subject matter which is regarded as the invention.

I claim:

1. A fish lure formed of an elongated rectangular strip of material of uniform width having a central axis of elongation, said lure having planar leading and trailing end portions generally aligned along the axis of elongation of said rectangular strip, the plane in which said leading end portion lies being perpendicular to the plane in which said trailing end portion lies, the central portion of said lure comprising a section twisted to perpendicularly orient said leading and trailing end portion planes, said twisted section exhibiting a high degree of rotation per unit of axial length and occupying the same axial length in the lure as said trailing end portion, said twisted section providing a combined spinning and zig-zag motion to said lure, said leading end portion being one-quarter the length of said trailing end portion, said trailing end portion providing a stabilizing rudder to said lure and having means for connecting a fish hook to the lure, said leading end portion having means for connecting the lure to a fishing line.

2. The fish lure according to claim 1 wherein said leading and trailing end portions present straight forward and rear edges lying normal to the sides of said rectangular strip of metal.

3. The fish lure according to claim 1 said rectangular strip of material is three times longer than it is wide.

* * * * *